United States Patent
Bastawala et al.

(10) Patent No.: US 7,743,333 B2
(45) Date of Patent: Jun. 22, 2010

(54) SUSPENDING A RESULT SET AND CONTINUING FROM A SUSPENDED RESULT SET FOR SCROLLABLE CURSORS

(75) Inventors: Mehul D. Bastawala, Menlo Park, CA (US); Lakshminarayanan Chidambaran, Sunnyvale, CA (US); Sreenivas Gollapudi, Cupertino, CA (US); Sanjay Kaluskar, Menlo Park, CA (US); Srinath Krishnaswamy, Fremont, CA (US); Debashish Chatterjee, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 719 days.

(21) Appl. No.: 11/097,065

(22) Filed: Apr. 1, 2005

(65) Prior Publication Data

US 2006/0036616 A1 Feb. 16, 2006

Related U.S. Application Data

(60) Provisional application No. 60/601,259, filed on Aug. 12, 2004.

(51) Int. Cl.
*G06F 3/00* (2006.01)
(52) U.S. Cl. .................. 715/738; 707/662; 707/713; 707/802
(58) Field of Classification Search .................. 707/100, 707/3, 1, 662, 705, 713, 802; 715/738
See application file for complete search history.

(56) References Cited

U.S. PATENT DOCUMENTS

| | | | |
|---|---|---|---|
| 3,444,528 A | 5/1969 | Lovell et al. | |
| 4,868,832 A | 9/1989 | Marrington et al. | |
| 5,157,663 A | 10/1992 | Major et al. | |
| 5,179,660 A | 1/1993 | Devany et al. | |
| 5,247,664 A | 9/1993 | Thompson et al. | |
| 5,535,326 A | 7/1996 | Baskey et al. | |
| 5,544,313 A | 8/1996 | Shachnai et al. | |
| 5,566,225 A | 10/1996 | Haas | |
| 5,566,297 A | 10/1996 | Devarakonda et al. | |
| 5,596,720 A | 1/1997 | Hamada et al. | |
| 5,633,999 A | 5/1997 | Clowes et al. | |
| 5,652,908 A | 7/1997 | Douglas et al. | |
| 5,666,479 A | 9/1997 | Kashimoto et al. | |
| 5,696,895 A | 12/1997 | Hemphill et al. | |

(Continued)

OTHER PUBLICATIONS

Barga, R. et al. "Phoenix Project: Fault-Tolerant Applications" ACM SIGMOD Record, Jun. 2002, vol. 31, No. 2, pp. 94-100.

(Continued)

*Primary Examiner*—Ba Huynh
*Assistant Examiner*—Enrique W Iturralde
(74) *Attorney, Agent, or Firm*—Vista IP Law Group, LLP.

(57) ABSTRACT

A system, method, computer program and system for suspending a result set and continuing from a suspended result set for a scrollable cursor is disclosed. The rows from a row source corresponding to the scrollable cursor result set are suspended into storage so that when a fetch is requested the data can be sent (continued) from the suspended storage and does not depend on the original scrollable cursor row source or session to be available.

36 Claims, 10 Drawing Sheets

U.S. PATENT DOCUMENTS

| | | | |
|---|---|---|---|
| 5,721,918 | A | 2/1998 | Nilsson et al. |
| 5,734,896 | A | 3/1998 | Rizvi et al. |
| 5,784,630 | A | 7/1998 | Saito et al. |
| 5,796,934 | A | 8/1998 | Bhanot et al. |
| 5,796,941 | A | 8/1998 | Lita |
| 5,796,999 | A | 8/1998 | Azagury |
| 5,819,019 | A | 10/1998 | Nelson |
| 5,832,483 | A | 11/1998 | Barker |
| 5,835,904 | A | 11/1998 | Vicik et al. |
| 5,850,507 | A | 12/1998 | Ngai et al. |
| 5,862,362 | A | 1/1999 | Somasegar et al. |
| 5,867,713 | A | 2/1999 | Shrader et al. |
| 5,870,545 | A | 2/1999 | Davis et al. |
| 5,890,963 | A | 4/1999 | Yen |
| 5,951,694 | A | 9/1999 | Choquier et al. |
| 6,038,677 | A | 3/2000 | Lawlor et al. |
| 6,047,323 | A | 4/2000 | Krause |
| 6,199,110 | B1 | 3/2001 | Rizvi et al. |
| 6,490,610 | B1 | 12/2002 | Rizvi et al. |
| 6,604,102 | B2 * | 8/2003 | Klein et al. .................... 707/4 |
| 6,728,747 | B1 | 4/2004 | Jenkins et al. |
| 7,013,311 | B2 | 3/2006 | Hui et al. |
| 7,287,090 | B1 | 10/2007 | Berg |
| 7,415,470 | B2 | 8/2008 | Kasametty et al. |
| 2002/0032678 | A1 | 3/2002 | Cornwell et al. |
| 2003/0078917 | A1* | 4/2003 | Goralwalla et al. ............ 707/3 |
| 2003/0236780 | A1* | 12/2003 | Saha et al. .................... 707/3 |
| 2004/0139078 | A1 | 7/2004 | Nakano et al. |
| 2005/0050019 | A1* | 3/2005 | Schwartz et al. ............... 707/3 |
| 2005/0246717 | A1 | 11/2005 | Poole et al. |
| 2005/0289160 | A1 | 12/2005 | Ashwin et al. |
| 2006/0036617 | A1 | 2/2006 | Bastawala et al. |
| 2006/0059176 | A1 | 3/2006 | Bastawala et al. |
| 2006/0230024 | A1 | 10/2006 | Lei et al. |

OTHER PUBLICATIONS

Harrison, R.B. et al. "Workload Balancing in a Distributed Environment" IBM Technical Disclosure Bulletin, Nov. 1995, Vo. 38, No. 11, pp. 273-276.

Haskin, R.L. et al. "On Extending the Functions of a Relational Database System" Proceedings of the 1982 ACM SIGMOD International Conference on Management of Data (SIGMOD '82), Orlando, FL, Jun. 2-4, 1982, pp. 207-212.

Jenkins, B. "Hash Functions" Dr. Dobb's Journal, Sep. 1997, pp. 107-109, 115-116.

Jensen, B. et al. Local Area Network Server Replacement Procedure, IBM Technical Disclosure Bulletin, Jan. 1995, vol. 38, No. 1, pp. 235-236.

Lomet, D. et al. "Efficient Transparent Application Recovery in Client-Server Information Systems" Proceedings of the 1998 ACM SIGMOD International Conference on Management of Data (SIGMOD '98), Seattle, WA, Jun. 2-4, 1998, pp. 460-471.

Satyanarayanan, M. "Coda: A Highly Available File System for a Distributed Workstation Environment" IEEE Transactions on Computers, Apr. 1990, vol. 39, No. 4, pp. 447-459.

Satyanarayanan, M. "Scalable, Secure, and Highly Available Distributed File Access", May 1990, IEEE Transactions on Computers, vol. 23, No. 5, pp. 9-18, 20-21.

Tewari, R. et al. "High Availability in Clustered Multimedia Servers" Proceedings of the 12th International Conference on Data Engineering (ICDE '96), New Orleans, LA, Feb. 26-Mar. 1, 1996, pp. 645-654.

Coulouris, G. et al. "Distributed Systems: Concepts and Design" 2nd Edition, 1994, Cover page, copyright page, forward, preface, table of contents, pp. 1-644, Addison-Wesley Publishing Company, Menlo Park, CA.

Notice of Allowance mailed Apr. 16, 2009 for U.S. Appl. No. 11/097,862.

Notice of Allowance mailed Jun. 11, 2009 for U.S. Appl. No. 11/097,422.

Sultan, F. et al., "Service Continuations: an operating system mechanism for dynamic migration of Internet service sessions", Oct. 6-18, 2003, IEEE, 177-186.

Murakami, K. et al., "Mobility Management Alternatives for Migration to Mobile Internet Session-Based Services", Jun. 2004, IEEE, vol. 22, 818-833.

* cited by examiner

| Row Number | Row Storage |
|---|---|
| row1   250 | persistent storage, persistent storage offset<br>read buffer, read buffer offset   260 |
| row2   252 | read buffer, read buffer offset   262<br>persistent storage, persistent storage offset<br>write buffer, write buffer offset |
| row3   254 | write buffer, write buffer offset   264 |
| row... | write buffer, write buffer offset |

258   Fig. 2C   268

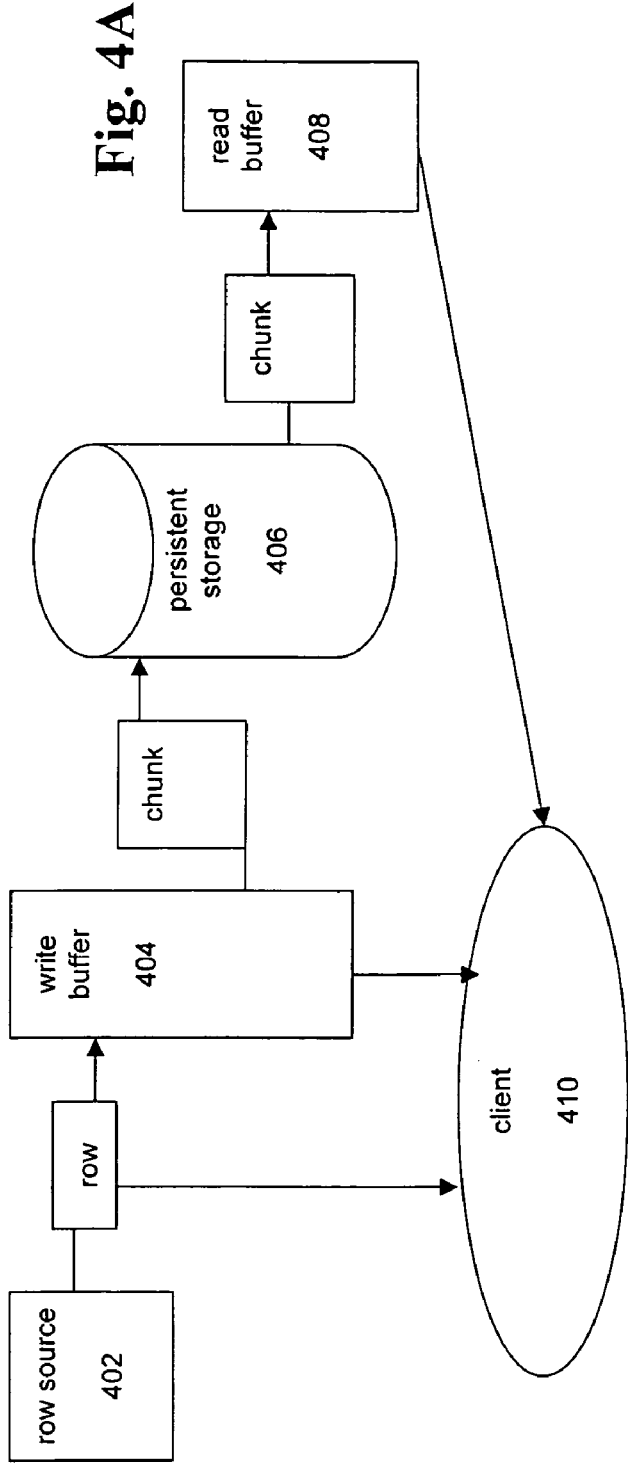
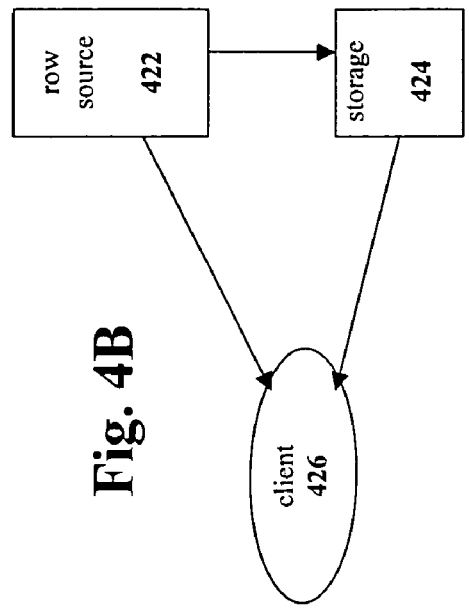
Fig. 4A
Fig. 4B

SUSPENDING A RESULT SET AND CONTINUING FROM A SUSPENDED RESULT SET FOR SCROLLABLE CURSORS

CROSS REFERENCED AND RELATED APPLICATIONS

This application claims benefit of Provisional Application Ser. No. 60/601,259 filed Aug. 12, 2004 which is hereby incorporated by reference as if fully set forth herein.

This application is related to the following applications: (a) Ser. No. 10/144,665, filed May 10, 2002, entitled "Method and System for Scrollable Cursors"; (b) Ser. No. 10/144,666, filed May 10, 2002, entitled "Method and Mechanism for Reducing Client-Side Memory Footprint of Data for Scrollable Cursors"; (c) Ser. No. 10/917,953 filed Aug. 12, 2004, entitled "Transparent Session Migration Across Servers," (d) Ser. No. 11/097,422 filed on even date herewith entitled "Suspending a Result Set and Continuing from a Suspended Result Set," based on Provisional Application Ser. No. 60/601,250; (e) Ser. No. 10/097,862 filed on even date herewith entitled "Suspending a Result Set and Continuing from a Suspended Result Set for Transparent Session Migration," based on Provisional Application Ser. No. 60/601,346; and (f) U.S. Provisional Application Ser. No. 60/495,368 filed Aug. 14, 2003, entitled "Computer Resource Provisioning". Each of the above disclosures is hereby incorporated by reference as if fully set forth herein.

BACKGROUND AND SUMMARY

The invention is related to computer systems, and more particularly to suspending and continue processes for a scrollable cursor.

Many computer systems utilize servers, such as "database servers" to store and maintain information. In a client-server computer system model (or a multi-tiered computer architecture), users that wish to access or modify information at the server are often located at a "client." To facilitate the explanation of the invention, the terms "database server" and "database client" may be used in this document in place of "server" and "client;" however, the invention is not limited in its applicability to database systems, and indeed, can be utilized in many other types of computer systems.

In client-server systems, users at a database client submit commands to the database server to store, modify, or retrieve data. In response to the user commands, data manipulation or query activities are performed at the database server, with data results returned back to the database client. In networked environments, the database server often performs data manipulation or query commands submitted by remotely located clients. The client may establish a direct connection to the database server over the network, or may establish a connection through one or more intervening system components, such as an application server or transaction processing monitor. In either case, the database server processes the user commands and generates appropriate data outputs to be returned to the client.

A common database function, for example, is to perform data queries using a database query language such as SQL. The database server receives each query and generates a query result set that satisfies the criteria defined by a particular query. The query result set is subsequently transferred to the database client from which the query originated.

A cursor is a handle to a query execution area, e.g., an area in memory in which a parsed structured query language ("SQL") statement and other information for processing the SQL statement is stored. In many database systems, a cursor is an available resource for accessing or parsing SQL statements embedded within an application. Cursors enable a SQL statement to retrieve rows from a database table into a given result set, which can then be accessed, displayed, or operated upon.

Each cursor has a client side cursor state and a server side cursor state. In server processing there are circumstances when the server side cursor state will go down. For example, when performing load balancing a server will migrate, restart, and/or redirect a session (e.g., a client and/or server session) from one server to another. This can cause an interruption in result set availability. It may be necessary to have access to a result set for the life of a client side cursor.

The present invention is directed to a method, system, and computer program product for suspending a result set and continuing from a suspended result set for a scrollable cursor. The rows from a row source are suspended into storage so that when a fetch is requested the data can be sent (continued) from storage and does not depend on the original row source or session to be available. In some embodiment(s) of the invention, suspending and continuing logic is used for scrollable cursors. A method for suspending a result set for scrollable cursors includes receiving a request from a scrollable cursor for data in a cursor result set, fetching the data of the result set, and suspending the data from the result set.

Further details of the embodiments are described below in the detailed description, drawings, and claims.

BRIEF DESCRIPTION OF THE DRAWINGS

FIG. 2C is a representation of a row mapping index.

FIG. 4A is a representation of a generic data flow for suspending and fetching operations.

FIG. 4B is a representation of the data flow in one example implementation of suspending and fetching operations.

DETAILED DESCRIPTION OF INVENTION

A method and system of suspending a result set, and continuing from a suspended result set for scrollable cursors is described. In the following description, for the purpose of explanation, numerous specific details are set forth in order to provide a thorough understanding of the presented embodiments. It will be apparent, however, to one skilled in the art that the embodiments may be practiced without these specific details.

Result Set

The result set is the output of executing a query. The embodiments may be applied to any type of data in the result set, including relational data. To facilitate the present explanation, the following description is made in the context of relational data. It is noted, however, that the embodiments may be applied to non-relational data.

Typically, a defined sequence of actions is performed to execute a query statement, e.g., a SQL query statement. The SQL query is typically processed using a parse, execute, fetch, and close cycle of operation. A cursor, or query execution area, is created, either in conjunction with the SQL query or independently. The cursor may be automatically handled by the database system, or manually controlled by a programmer through an application programming interface. The SQL statement is thereafter parsed, optimized, and executed to produce a set of rows called the result set or row source. The rows in the result set can be extracted from the cursor ("fetched") either a row at a time or in groups. A row source can be located in the SQL execution cursor area on the server for a database application.

Figure 1A:
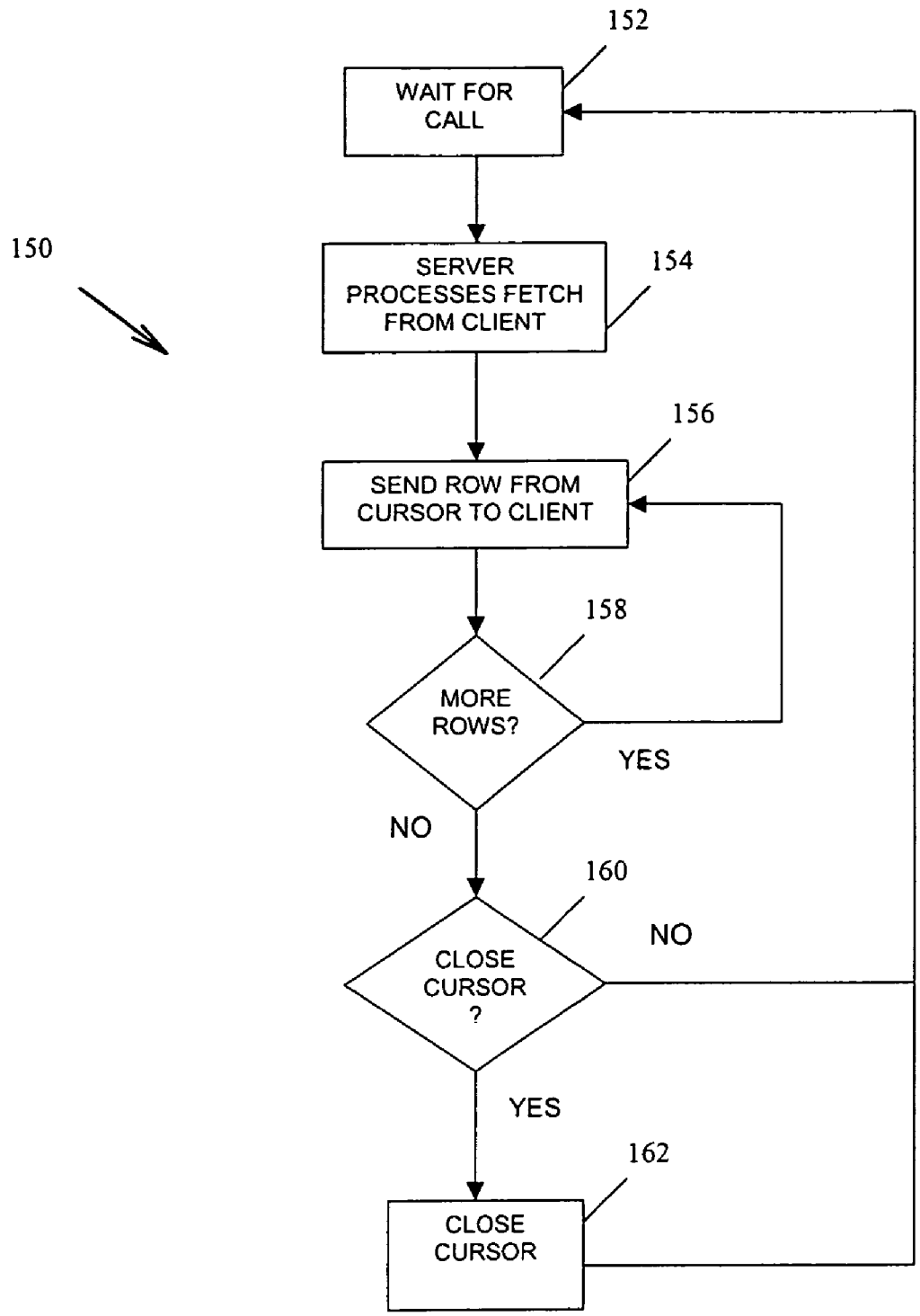
FIG. 1A is a flowchart 150 of a generic example of a server processing a client fetch query.

For example, process 150 shown in FIG. 1A represents one way for a server to handle fetch operations. The server waits for a client call in process action (152). Process action (154) processes a fetch request for a client. A row from the result set produced by the cursor is sent from the cursor to the client in process action (156). Process action (158) determines if there are more rows to be fetched. If there are more rows, process 150 returns to process action (156) to return another row. If there are no more rows process action (160) determines if the cursor should be closed. If the cursor should be closed, the cursor is closed in process action (162). After the cursor is closed or if the cursor should not be closed, process 150 returns to process action (152) and waits for the next call.

The database server produces a result set composed of a quantity of data that can be sent to a database client. The user may initially place an explicit request to transmit a first portion of that result set from the database server to the client. At a later time, the client may request a second portion of the result set. This process may proceed until the entire result set is sent, or until the client stops requesting additional portions of the result set. This process results in one or more roundtrips between the database server and the client.

A portion of the result set can be transmitted prior to the client request for that portion. Transmitting information prior to it being immediately requested by the client is referred to as pre-fetching. Pre-fetching can be based on predictive selection of data anticipated to be requested by a client in the future. A determination is made of whether there exists any need or advantage to pre-fetch. The determination is made in a predictive manner based upon different factors. Some example factors include, but are not limited to, data compression ratios, likelihood of the client requesting the data, and roundtrip delay.

While the cursor is active it has a client side cursor state and a server side cursor state. The cursor is used to access the result set. In certain instances the server side cursor is eliminated, disrupting access to the result set. However, it may be necessary to have access to a result set for the life of a client side cursor. Not having access could be a correctness issue. One option is to reissue the query on a new server session. However, even having to reissue the client query to obtain the next set of rows can be a correctness issue. For example re-execution of a query may not guarantee the same results or the same order of results. Access can be maintained to the result set by suspending the result set, i.e. storing the result set such that access is preserved even in the event that the cursor is unavailable. Process 240 in FIG. 2B shows an example suspend process. This process is explained in the SUSPENDING section.

Storage

As mentioned above, when the cursor is active, operations can be performed against the specific row or group of rows at which the cursor is pointing. In some cases, the result set can only be accessed by the specific cursor (e.g., a specific client cursor), and only while the cursor is active. It may also be desirous, in one embodiment, to access and operate on the result set after the server side cursor has been closed. Another embodiment accesses the result set from another client session.

One method of accommodating the various embodiments, is to suspend the result set into the client. However, the client may not have a large enough storage to store the entire result set or have the desire to use the storage for the result set. Further, a client storage may only be available to that client. The solution to make a result set available after a cursor is closed and not consume much of the client storage space, as presented in one embodiment, is to pre-fetch and store the cursor result set.

Storage for a suspended result set can take many forms. Example storage forms include but are not limited to: server cache, server workspace, server persistent storage, server memory shared across nodes, server persistent storage shared across nodes, session cache, session shared memory, session private memory, client cache, client persistent storage, other client memory, other server memory, persistent storage that does not incur transactional overhead such as redo or undo logging or minimizes the use of such transactional logging, or a combination of any of the foregoing. For example, some embodiments depicted in FIG. 2-5 show the suspended result set using a combination of persistent and memory storage. The type of storage used to suspend the result set is selected by the application, or chosen internally, and depends on the intended use of the result set and availability of system resources. The result set storage, in one embodiment, is contiguous space. Another embodiment uses non-contiguous space. In one embodiment the type of storage may be automatically determined based on statistics collected over a period of time. For example, suppose an application was using a result set located on a server with limited available memory. If this result set is suspended, the storage location(s) chosen would be persistent storage or a combination including persistent storage so as minimize consumption of additional memory. However, if the current server memory usage is low, the storage location(s) chosen for a suspended result set could be server memory.

If persistent storage is chosen as the form of storage, one embodiment uses Large Objects (LOB) for the persistent storage, however any storage that is accessible between database nodes is acceptable. The following are two example approaches to creating an LOB. A temporary, or non-sharable, LOB can be created that is visible only in the database node in which it is created. A permanent, or sharable, LOB can be created that is more persistent. That is, the sharable LOB is able to exist for the lifetime of a database and is sharable across database nodes. Hence, a non-sharable LOB can be created in one database node that is not valid in another database node, and a sharable LOB can be created in one database node that is valid in another database node. The persistent storage can be located on the server or on the client.

In one embodiment, the suspended result set storage can be in the memory of a first node, and transmitted to a second node that is continuing the fetches. This may minimize costs (e.g., I/O costs) of accessing persistent storage. Example of methods that may be employed to accomplish this include distributed SQL, inter-process communications, or fast interconnects.

Packing

The suspended result set, in one embodiment, is self-describing storage. That is, the storage has a specific layout and includes information describing that layout. Self-describing storage can include data descriptions, or metadata, within the storage so that entities accessing the storage know what to expect upon reading the storage. Self-describing storage can be helpful, for example, when the server-side cursor is eliminated and the result set still needs to be accessible.

The metadata of the suspended result set can be packed using one packing logic and the values of the suspended result set can be packed using another packing logic. Another embodiment uses compression techniques in addition to the packing layout. In another embodiment, the packing layout includes a version to allow compatibility with older and future versions. Another embodiment uses both version and compression techniques. Further details regarding compression techniques that can be applied are disclosed in application Ser. No. 10/144,666, filed May 10, 2002, entitled "Method and Mechanism for Reducing Client-Side Memory Footprint of Data for Scrollable Cursors," and/or application Ser. No. 09/515,674, filed Feb. 29, 2000, entitled "Method and Mechanism for Reducing Client-Side Memory Footprint of Transmitted Data," which are hereby incorporated by reference in their entirety.

The area of the suspended result set containing the metadata is called the header. Table 1 shows one embodiment of the metadata content. This content can include header size, storage version, header checksum, and number of columns. The header size details the number of bytes the metadata consumes. The storage version specifies how to pack and unpack the result set. The header checksum is the checksum of all the header bytes. The number of columns details the number of columns that the result set contains.

In one example embodiment, as shown in Table 1, the header area related to individual column metadata contains two metadata values: data type and max length. The metadata for each column follows one after the other. The data type details what data type the result set column contains. The maximum length is the maximum length that the data type will consume and can be used to allocated the space for the receiving the row from the suspended result set.

TABLE 1

Example Suspended result set storage header (metadata) layout

Metadata Content

Header size
storage version
Header checksum
Number of columns
Column 1: data type
Column 1: max length
Column n: data type
Column n: max length The data types can be simple scalar types, such as a NUMBER or CHAR, or complex non-scalar, such as a collector type or object type. In one embodiment, such data types are packed as a linear image of the original object and the header can include additional type metadata information, such as for example, object (or collector) ID length and object (or collector) ID bytes. In one embodiment this additional metadata information can be used by the client to unpack the stored linear image into its original collector type data form.

One embodiment for the row packing format is shown in Table 2. The row packing format can include: row size, and column specific information for each column such as actual length, column flags and column value. The row size can be used as a checksum to ensure all the bytes were packed and unpacked correctly. In another embodiment, the row size and column size can be stored with the row mapping index (see FIG. 2C and related text), as opposed to being stored in the suspended result set. Note that data in the suspended result set can be packed using actual length to minimize storage size. Another embodiment combines the row packing layout with data compression techniques to save space while suspending and continuing from a suspended result set.

TABLE 2

Example Suspended Result Set Packed Row (data) format

Row Content

Rowsize
Column 1: actual length
Column 1: flags
Column 1: value
Column n: . . .

When persistent storage is used, one embodiment organizes the writes and reads into a particular size called a chunk. The actual size of the column value can vary so the read/write sizes can be converted into chunks at run-time. The conversion to chunks is aided by the layout or packing logic. The packing logic provides a map so that flags can act as place holders and identify suspended actions. Memory chunks are sized to optimize persistent storage access instead of accessing persistent storage columns or rows at a time.

The memory buffer could be exhausted at any point of writing these bytes. The state is maintained so that next call (and next chunk) can continue from where the packing-phase was last suspended. For example, assume only a portion of the bytes of the size field (at a particular column) could be written when the end of the chunk was reached. The state and offset information is stored. In the next call, the saved state and offset value are used to write the next byte(s).

Suspending

The suspending operation captures rows of the row source into storage so that if something were to happen to the row source, to the server cursor, or to the session, the result set would still be available. This allows the result set to be available for the life of the client cursor, not just the life of the server cursor. The suspending operation can handle distributed SQL queries and queries involving client pre-fetching, or both. In addition, suspending during an already running fetch does not require any application changes. The suspension operation occurs transparently with minimal impact to client fetch requests. That is, the suspension operation is performed in a manner that minimizes client fetch request delay so that the client remains unaware of the suspension. In one embodiment, the suspending operation of a cursor result set can be completely independent from fetch operations and/or other continuing-from-suspended-result-set operations that may be performed upon that result set. For example, in one embodiment, the suspending can occur after every round-trip from the client even though the client request may be for a DML or for a different cursor. In one embodiment suspending of the result set on the cursor that has been parsed and executed on the server can occur before any rows are sent to the client. In another embodiment, suspending can occur after rows are sent to the client, i.e., in the middle of fetching. Suspending allows the pending result set to be retained without retaining the server cursor area or the server session. In one example, the pending result set for sequential cursors would be the rows not yet seen by the client. In another example, the pending result set for scrollable cursors can potentially be the entire result set.

One way to suspend a result set is by process 240, a generic example of a server suspending a row source, shown in FIG. 2B. Process 240 is a reentrant process, i.e., it can be stopped and invoked later to suspend additional rows. The following description of FIG. 2B will reference FIG. 4B. Process 240 starts at process action (242) when a call is made to suspend a server result set, e.g., by another process. Process action (244) determines if there are more rows in the row source 422. The row source is the SQL execution cursor area on the server for a database application. If there are more rows in the row source 422, the row is suspended in process action (246) by storing the row in the suspended result set storage 424. Then client 426 can access the suspended result set in storage 424 even after the cursor has become unavailable.

Process action (248) determines if any of a set of constraints have been violated. Constraints may be based upon any factors/parameters that can be set to control whether, how, and when the present suspending process can be employed, e.g., the constraint conditions may be related to time and space and set to minimize the impact that the suspending process 200 has on other server operations (e.g., client fetches). For example, the constraint may include or relate to factors that prevent the process from affecting client latency or system performance. This may relate to, for example, server resource utilization, time-based factors, number of rows, consumption of I/O resources, etc. The constraints may be based upon, for example, each cursor, all cursors of a session, all sessions in a node, and/or all nodes of a cluster. The suspend process will suspend as many rows in the result set row source (e.g., action 244 of FIG. 2B) until it is limited by one or more (or even all) of the constraints.

In one embodiment, the timeout constraint is set by padding the average cursor roundtrip time with an absolute delay value or a percent delay factor. This prevents delay of any roundtrip that uses the whole (average roundtrip time+delay value) time. It also allows the suspend operation to occur, and adds only a small delay to any roundtrip that uses less than the average roundtrip time. The timeout limit can be set per cursor or per session, for all the cursors as a group. A space limit is set for each cursor's active memory capacity of for all cursors as a group. Another example of a space limit is for limiting the amount of persistent storage occupied by the suspended result set(s). These memory and/or persistent storage constraints can be set for each cursor, for all cursors in a session, all sessions in a node, and/or all nodes in a cluster.

If any constraints have been violated, control returns to the process that invoked process 240. If the constraints have not been violated, process 240 returns to process action (244) to determine if there are more rows in the row source to suspend. If there are no more rows in the row source, control returns to the invoking process (such as process 270 in FIG. 2D).

Figure 2A:
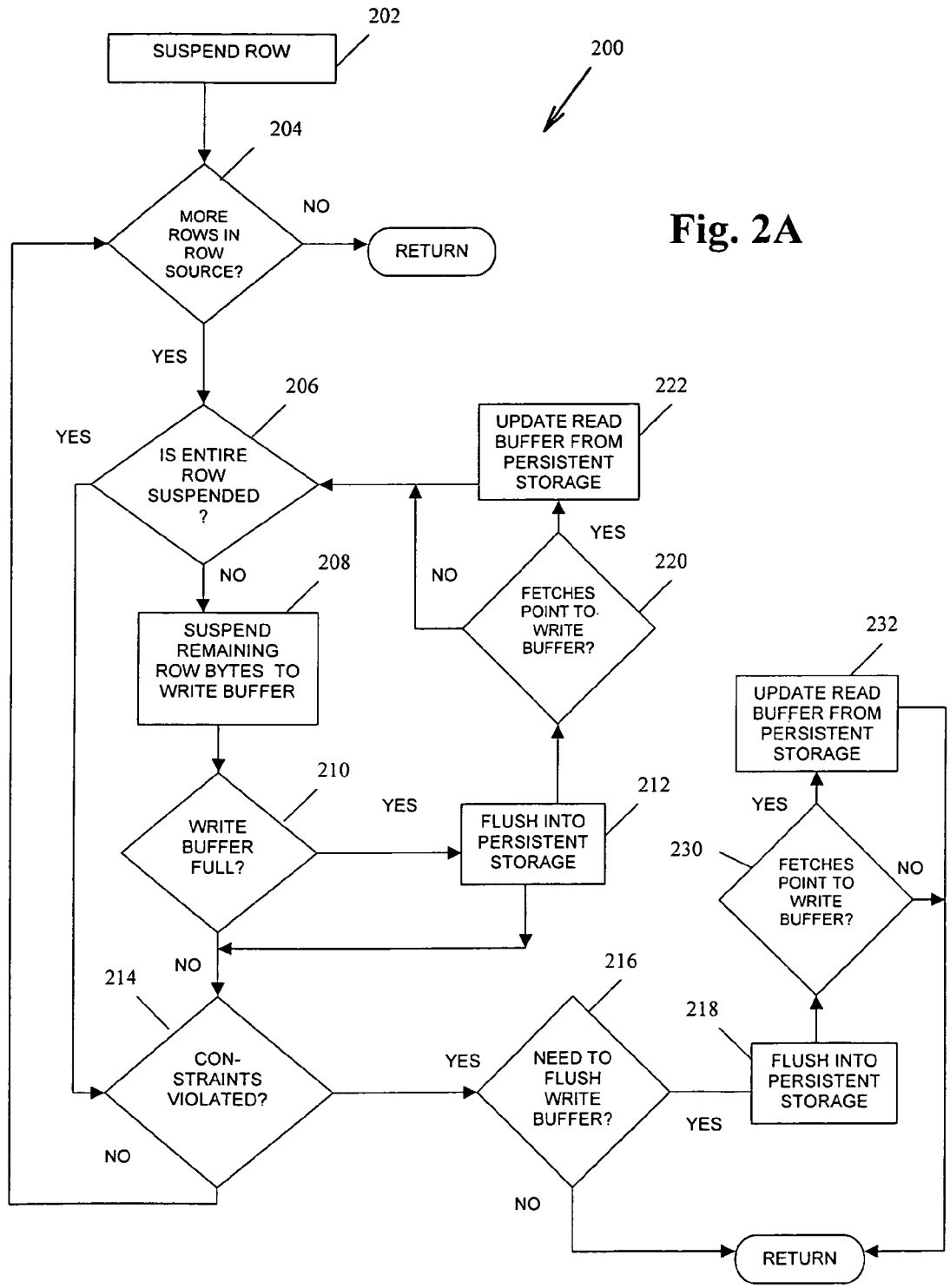
FIG. 2A is a representation of a process 200, an example implementation of suspending a row of a server result set.
Figure 2B:
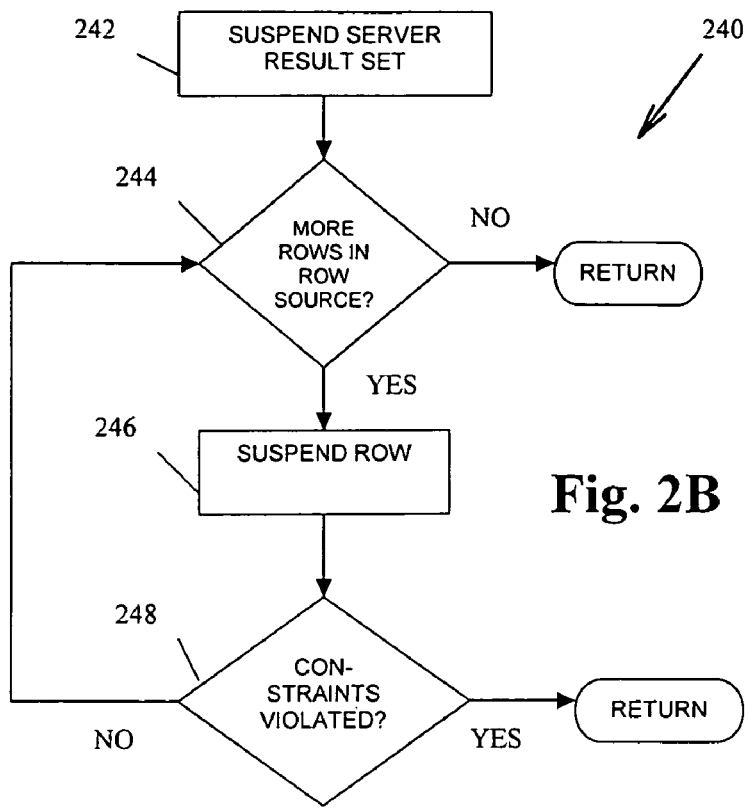
FIG. 2B is a representation of process 240, a generic example of a server suspending a server row source.

Another way to suspend a row of the result set is by the embodiment of the suspend a row process 200 shown in FIG. 2A. Process 200 is a reentrant process, i.e., it can be stopped and invoked later to suspend additional rows. As mentioned above, the storage chosen by the suspend process can be any of several types. This embodiment shows the use of persistent storage as the result set repository. However, the entire suspended set could be stored in other locations, e.g., in memory if available. Process 200 also uses a write buffer, the row source, and a read buffer. The write buffer is used to hold row bytes of the suspended result set being suspended to optimize access to persistent storage, and minimize any performance degradation to the client application. The write buffer receives the result set in sequential order (although there may be gaps in the sequence) in each call. Gaps may occur because all the rows need not be suspended. The read buffer is holding a portion of the result set for the rows that are being set to the client in order to optimize access to persistent storage.

The following description of FIG. 2A will reference FIG. 4A, which is a representation of the dataflow of the suspending and continuing processes. Process action (202) begins the suspend a row process and creates a Result Set ID.

The Result Set ID serves as a pointer to the suspended result set that is either passed to the client, stored in a database for later extraction, and/or used for deleting the suspended result set (and freeing all its resources) from the database. In one embodiment, the Result Set ID include a logical session identifier for the client session and a cursor identifier for the client cursor. The logical session identifier can be used to locate the result set when the server state of the client session changes (e.g., during transparent session migration). The contents of a Result Set ID need not be interpreted by the entity that invokes the suspend/continue logic. Further information regarding session identifiers can be found in co-pending application Ser. No. 11/071,275, entitled "Global Session Identifiers in a Multi-Node System" filed Mar. 25, 2005, which is hereby incorporated by reference as if fully set forth herein.

In one embodiment, the invoking entity calls the suspend logic with a cursor identifier, number of rows to suspend, and a set of constraints. After suspension, the Result Set ID is returned to the invoking entity. The invoking entity passes the Result Set ID to the continue logic along with the number of rows to be fetched.

It is determined, in process action (204), if there are more rows in the row source to be stored. One embodiment suspends all the rows of a result set 402, while another embodiment suspends a selected subset of the result set 402. If there are no more rows in result set 402 to be stored, process 200 returns control to the invoking process. If there are more rows in the row source 402 that need to be suspended, process action (206) determines if the entire row has been suspended. If the entire row has not been suspended, process action (208) suspends the remaining row bytes from row source 402 to the write buffer 404 and process action (210) determines if cursor write buffer 404 is full. If the entire row has been suspended or if the remaining row bytes are suspended to the write buffer and the writer buffer is not full, process action (214) determines if the constraint values are violated. If process action (210) determines that the write buffer is full, the data is flushed into persistent storage 406 in process action (212).

Process action (220) determines if the last fetch obtained data from (points to) the write buffer. If the last fetch points to the write buffer, process action (222) updates the read buffer 408 from persistent storage 406. This is done because the full write buffer was just flushed into persistent storage, therefore, by updating the read buffer from persistent storage, the data the client is likely to request next is already in the read buffer. If the fetch does not point to the write buffer or after the read buffer has been updated, process 200 returns to process action (206) to determine if the entire row is suspended and the process continues from process action 206 as detailed above.

If process action (214) determines that the constraint values are not exceeded, process 200 returns to process action (204) to determine if there are more rows in the row source. If constraints are violated then process action (216) determines if cursor write buffer 404 needs to be flushed to store the remaining data prior to stopping. If the write buffer needs to be flushed, process action (218) flushes cursor write buffer 404 into persistent storage 406. Process action (230) determines if the last fetch obtained data from, or points to, the write buffer. If the last fetch points to the write buffer, process action (232) updates the read buffer 408 from persistent storage 406. This is done because the full write buffer was just flushed into persistent storage, and by updating the read buffer from persistent storage, the data the client is likely to request next is already in the read buffer. In process 200, if the fetch does not point to the write buffer, or after the read buffer has been updated, process 200 returns control to the invoking program. The process will return control to the invoking program if a constraint condition has been exceeded but there is no need to flush the write buffer as in when the write buffer has already been flushed.

Figure 2D:
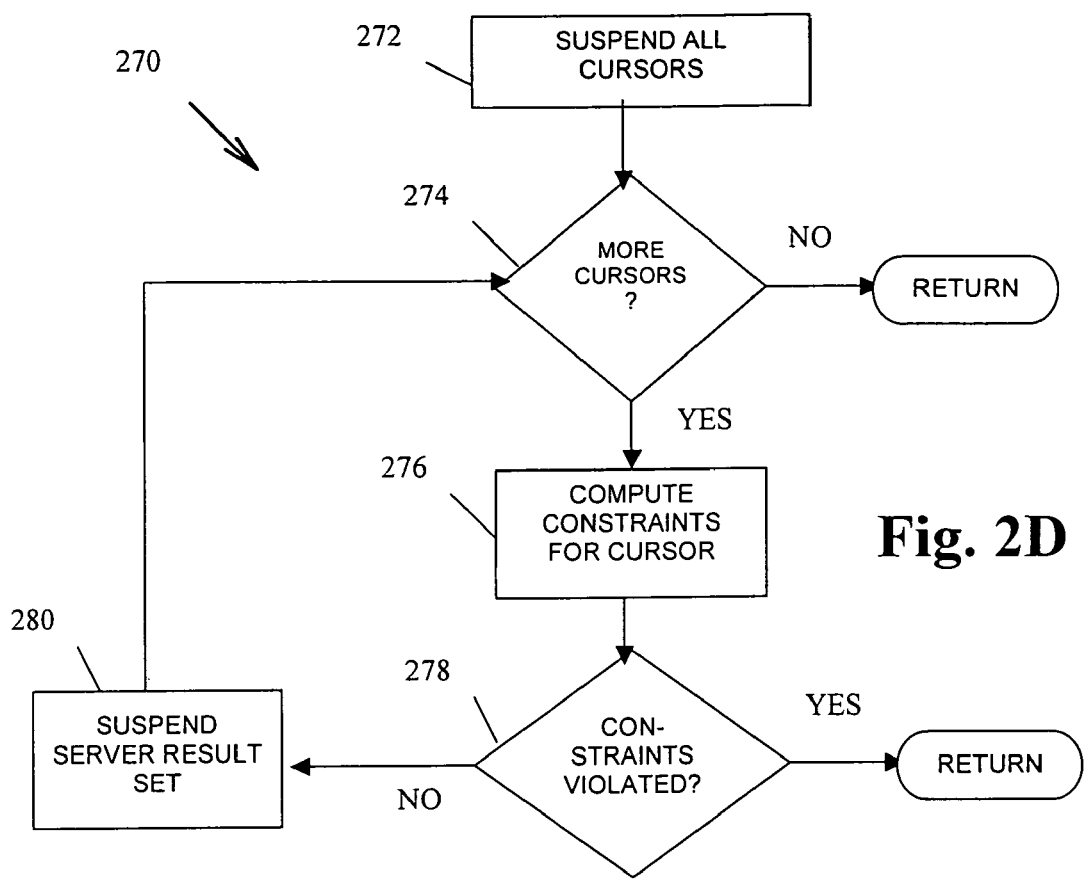
FIG. 2D is a representation of process 270, the suspend all cursors process.

Process 270, the suspend all cursors process is shown in FIG. 2D. It is used for suspending all the cursors in a session. For example, a server may have idle time and suspend cursor result sets as background operations. The server would invoke process 270 to accomplish the cursor suspension. In one embodiment, once the server receives a request from the client, it can halt suspension for subsequent rows as a constraint violation.

Process action (272) starts the suspend all cursors process. Process action (274) determines if there are more cursors to be suspended. If there are no more cursors to be suspended, process 270 returns control to the invoking process (e.g., sever background operations). If there are more cursors to suspend, process action (276) computes the constraint values for the next cursor. Process action (278) determines if any constraint values are violated. If the constraint values are violated, process 270 return control to the invoking process. If the constraint are not violated, process action (280) invokes the suspend a server result set process (e.g., process 240, shown in FIG. 2B). Process 270 loops back to process action (274) to determine if there are more cursors to suspend.

According to one embodiment, the system can remove or age out one or more of the suspended result sets. If the client cursor or session corresponding to a result set has ended, then that result set is eligible for removal. Any suitable approach may be used to determine which eligible result set should be removed or aged out. For example, a least recently used approach may be employed to remove one or more eligible result sets. Alternatively, a clean-up procedure may be employed to periodically remove some or all of the result sets eligible for removal.

During the suspending of the row source, a row mapping index is created and maintained. This row mapping index, correlates the result set row to a specific storage location and offset. For example, FIG. 2C is a representation of one embodiment of such a mapping index. Another embodiment has a mapping index for each storage area. In one embodiment, the row mapping index only stores the location index for the next row (e.g., for sequential cursors). In FIG. 2C the result set row number is located in column 258, and the row storage information is located in column 268. For each row number (elements 250-254) in column 258, there exists a corresponding row storage area (elements 260-264) in column 268 that identifies its location. For example, row 1 element 250, is shown in row storage area 260 as located partially in persistent storage at the persistent storage offset and partially at the read buffer at the read buffer offset. Row 3, element 254, is shown in row storage area 264 as located in write buffer at the write buffer offset.

The row mapping index is updated each time any row in the result set is moved. Some examples of when the row mapping is updated are when the rows are suspended into the write buffer, and when the read buffer is updated with a chunk from persistent storage. The row mapping index can be stored in one or more of any of the storage mechanisms mentioned in this disclosure, including as part of the suspended result set.

The process may be optimized with respect to handling of a distributed query. A distributed query is one in which the query may access underlying base data from multiple network locations. In one embodiment, the suspending logic is transparent with respect to the node(s) at which the data is located. In an alternate embodiment, suspending a result set related to a distributed query may be optimized by first transferring data responsive to the query from one node to another, and then performing the suspend operation at the node which now contains all the data.

Suspending a result set has many applications. One example application of a suspended result set is to be able to continue from the suspended result set, which is described in detail below. In one embodiment, suspending and continuing from a suspended result set can be transparent to the client application. In another embodiment, the suspending and the continuing operations can be explicitly invoked by the client application. Other examples include: if the system is busy the result set can be suspended to allow use at a later time and yet free up resources now, if the system wants to retain access to the data after the cursor is closed and/or after the session has ended.

Continuing During Suspending

Continuing during suspending is the term used for the operation of accessing a result set while the result set is being suspended. The client is allowed to maintain fetch operations while the server is suspending the result set. This provides the client with the desired data while it allows the server to prepare for the eventual elimination of the server cursor.

Figure 1B:
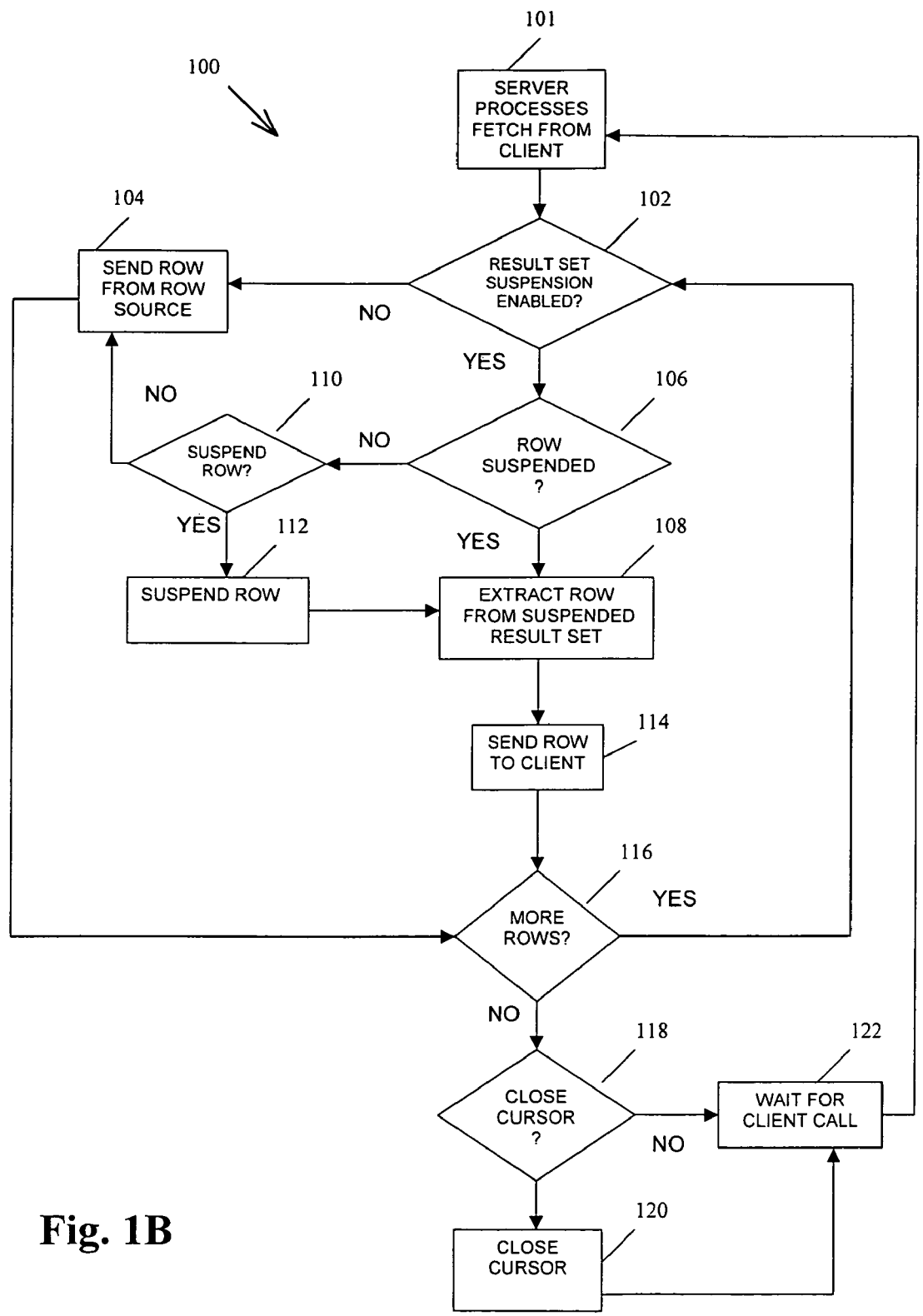
FIG. 1B is a flowchart 100, an example of a server processing a client fetch of a result set with an option of suspending the result set.

FIG. 1B is a flowchart 100, a generic example of a server processing a client fetch of a result set with an option of suspending the result set. The discussion of FIG. 1B will reference FIG. 4B. In process action (101) the client executes a fetch query and the server processes the query. Process action (102) determines if result set suspension has been enabled. If result set suspension has not been enabled, the result set is simply fetched from the row source 422 in process action (104). However, if result set suspension has been enabled a Result Set ID is created and, process action (106) determines if the precise row requested has been suspended, i.e., if the precise row exists in storage location 424 used for the suspension process. If the row has been suspended, process action (108) fetches the row from the suspended result set and the fetched row is returned to client 426 in process action (114). If the row has not been suspended, process action (110) determines if the row should be suspended. If the row should be suspended, process action (112) suspends the row (e.g., into the suspended result set) (See FIGS. 2A and 2B). If the row is not to be suspended, process action (104) returns the row to client 426 from the cursor row source 422. Process action (116) determines if there are more rows in the result set. If there are more rows in the result set, process 100 returns to process action (102) and repeats the process. If there are no more rows in the result set, process action (118) determines if the cursor should be closed. If the cursor should be closed, process action (120) closes the cursor. If the cursor is not to be closed, process action (122) waits for the next client call and returns to process action (101).

An advantage of the embodiments is that the suspending operation is transparent to the client as the client is still receiving the fetched data without noticeable delay. The suspending operation causes minimal impact on the client fetch operation, so that the client is unaware that the suspending operation is taking place. The client is receiving the data while the server is suspending the result for other uses. Also, note in process 100 that the suspension process can be called at any time to add more rows to the suspended result set.

Figure 3:
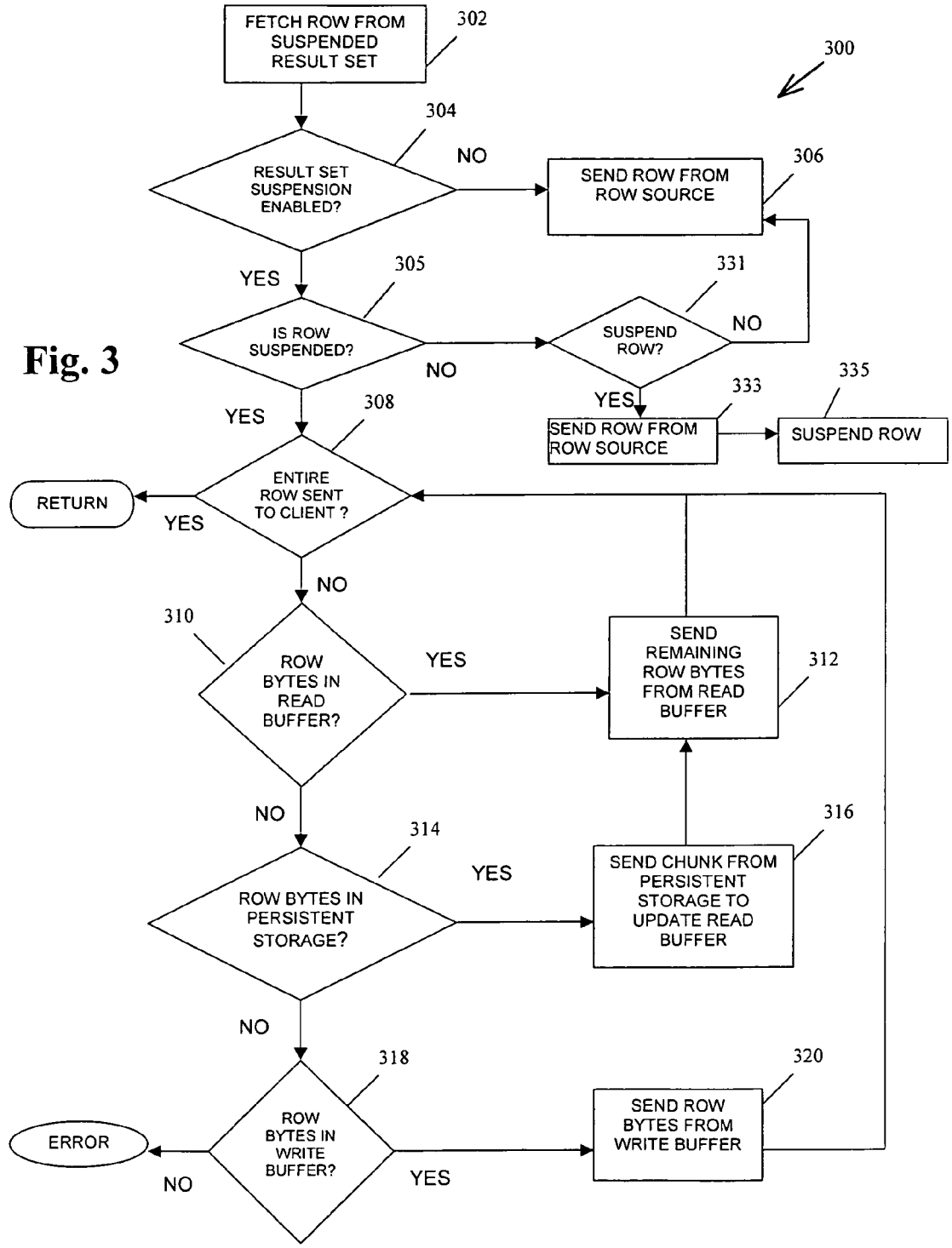
FIG. 3 is a representation of process 300, an example of fetching a row of a result set while the result set is being suspended.

FIG. 3 is a flowchart representing another embodiment of a server processing a client fetch of a result set while the result set is being suspended, the cursor fetch from a suspended result set process 300. The following description of FIG. 3 will reference FIG. 4A. Process action (302) begins the fetch row from the suspended result set process. Process action (304) determines if the result set suspension is enabled. If the result set suspension is not enabled, the fetch sends the row from cursor row source 402 to client 410 in process action (306). If the result set suspension is enabled the Result Set ID is obtained and, process action (305) determines if the specific row has been suspended.

If the row has not been suspended, a determination is made whether the row should be suspended (331). If it is determined that the row should be suspended, then the row is sent from the row source (333) and is then suspended (335). In another embodiment, one can first suspend the row and then extract the row starting from action 308 in FIG. 3. Alternatively, and with respect to FIG. 1B, the row is suspended first (112), then fetched (extracted) from the suspended result set (108), then sent to the client (114). One embodiment of suspending a row is described in FIG. 2A. If the row is not to be suspended based upon the determination of 331, then the process returns to action 306 to send the row from the row source.

In one embodiment, for sequential cursors, it is not necessary to suspend rows that are being sent to the client. Therefore, action 331 would be not to suspend the row. For scrollable cursors, action 331 would be to suspend the row since the client fetches can potentially scroll backwards.

If the row has been suspended based upon the action of 305, then process action (308) determines if the entire row has been sent to the client. If the entire row has been sent to the client, the process returns to the invoking process.

If the entire row has not been sent to the client, the process action (310) determines if the row bytes are in the read buffer 408. If the row mapping index indicates that the subject row bytes are located in read buffer 408, process action (312) locates the row bytes at the indexed offset in the read buffer and sends the remaining row byes from read buffer 408 to the client 410. If the row mapping index indicates that subject row bytes are not located in read buffer 408, process action (314) determines if the row bytes are located in persistent storage 406 (placed there when the write buffer is flushed to persistent storage in the suspension processes). If the row mapping index indicates that subject row bytes are located in persistent storage 406, the row byte offset from the row mapping index is used to locate the row bytes in persistent storage and read buffer 408 is updated with a chunk of row byte data from persistent storage 406 in process action (316). The row bytes are sent from read buffer 408 to client 410 in process action (312). If the row mapping index indicates that subject row bytes are not located in persistent storage 406, process action (318) determines if the subject row bytes are in write buffer 404. If the row mapping index indicates that subject row bytes are located in write buffer 404, process action (320) locates the row bytes using the offset from the row mapping index in write buffer 404 and sends the row bytes from write buffer 404 to client 410. If the row mapping index indicates that subject row bytes are not in write buffer 404 (i.e., not in any of the storage locations), the fetch is in error and is handled by the error processing system.

If the data was sent from the read buffer in process action (312), or the write buffer in process action (320), process 300 returns to process action (308) to determine of the entire row was sent to the client or if more row bytes are required. If the entire row has not yet been sent to the client the process precedes to process action (310) as described above. If the entire row has been sent to the client, the process returns to the invoking operation. Using read and write memory buffers as mentioned above help reduce I/O costs to persistent storage, however, they are not a required element. Any form of storage can be used.

Continuing After Suspending

Continuing after suspending is the term used for the operation of accessing a result set that has previously been suspended. One example of when continuing from a suspended result set may be required is when a server cursor is no longer available, perhaps due to the migration of the client to another server session. Continuing from the suspended result set allows the client cursor access to the result set even though the server cursor is no longer available.

Figure 5A:
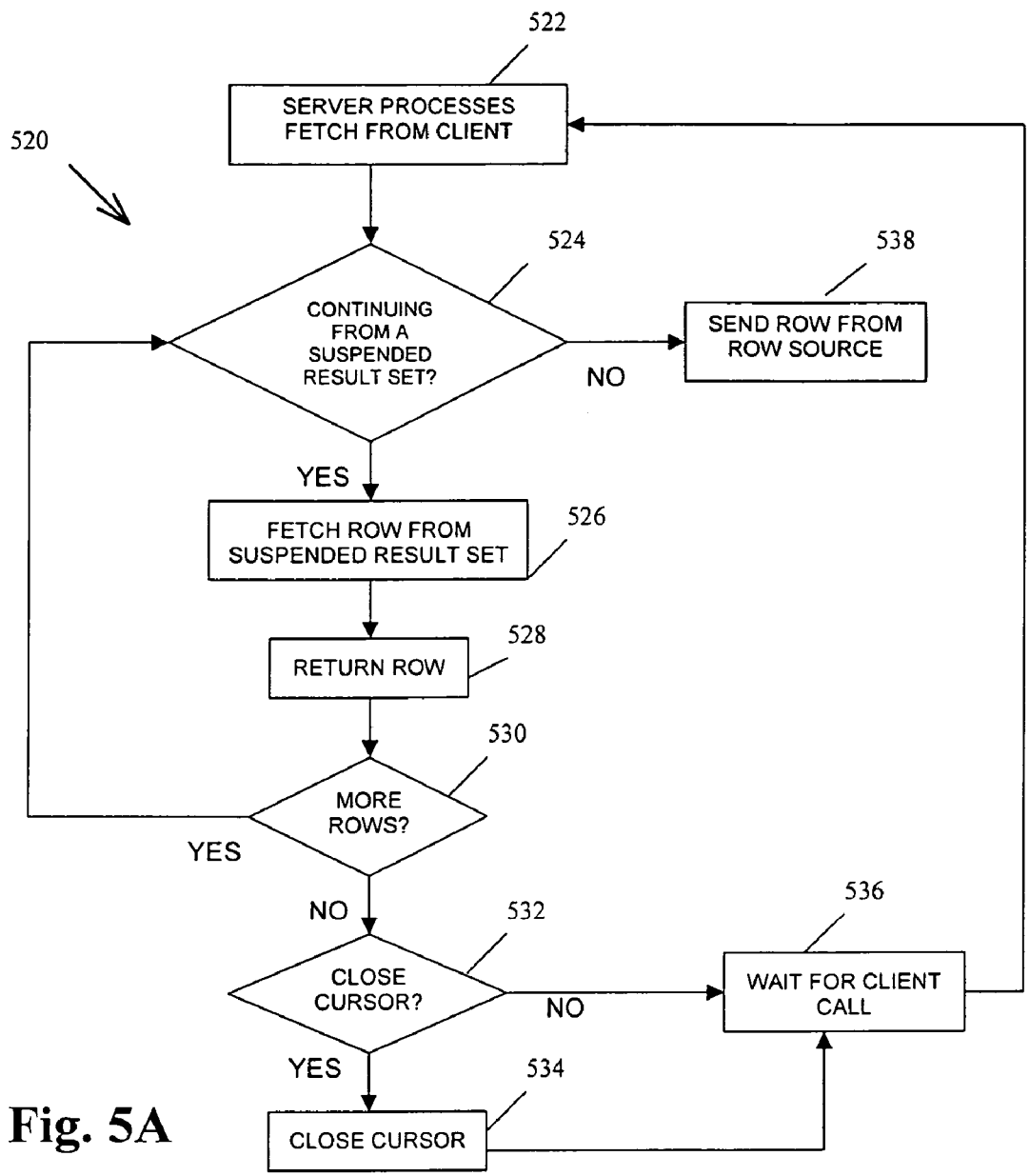
FIG. 5A is a representation process 520, a generic example of continuing client fetches from a suspended result set after suspension.

Fetch process 520 shown in FIG. 5A is a generic all purpose example of a server processing a fetch from a client. Discussion for FIG. 5A will reference FIG. 4B. Process 520 begins with process action (522) after being invoked by client fetch query. Process action (524) determines if the fetch is continuing from a suspended result set. If the result set is not suspended, process action (538) sends the row from row source 422 to client 426. If the result set is suspended, process action (526) fetches the row from the suspended result set storage 424. Process action (528) returns the row to client 426. Process action (530) determines if there are more rows to be fetched. If there are more rows, process 520 loops back to process action (524) to process the additional rows. If there are no more rows in the client query request to be fetched, process action (532) determines if the cursor should be closed. If the cursor should be closed, process action (534) closes the cursor. If the cursor should not be closed, process action (536) waits for the next client call.

Figure 5B:
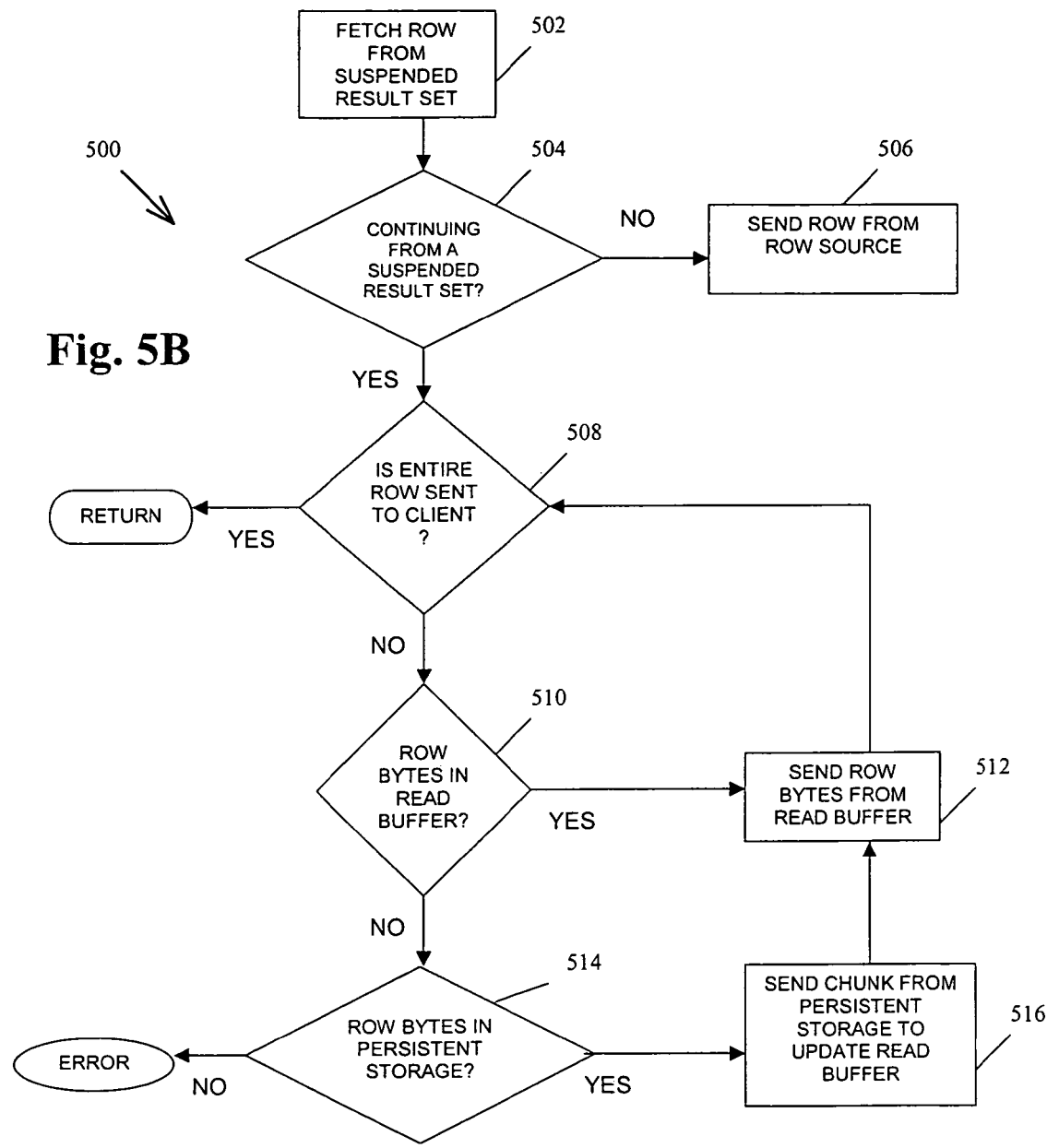
FIG. 5B is a representation of process 500, an example embodiment of continuing client fetches from a suspended result set after suspension.

Fetch process 500 of FIG. 5B is another embodiment of the cursor fetch process after suspending. This process can be used either after the suspending process is complete or when no result set suspending is necessary. The discussion for this figure will refer to the FIG. 4A dataflow representation. Note that fetch process 500 does not utilize the write buffer 404. The data from the write buffer, after suspending, has been stored in the persistent storage 406. In another embodiment, the write buffer 404 can be maintained, for example, in order to optimize the number of disk I/Os.

Fetch process 500 begins with process action (502). Process action (504) determines if the fetch is continuing from a suspended result set. If the fetch is not continuing from a suspended result set, process action (506) sends the row to the client 410 from the row source 402. If the fetch is continuing from a suspended result set, the Result Set ID is obtained and, process action (508) determines if the entire row has been sent to the client. If the entire row has been sent to the client, the process 500 returns control to the invoking operation (e.g., client query). If the entire row has not been sent to the client, process action (510) determines if the subject row bytes are in the cursor read buffer 408. If the row mapping index indicates that the subject row bytes are in the read buffer, process action (512) uses the row mapping index offset to locate the row bytes and sends the remaining row bytes from the read buffer 408 to the client 410. Process action (512) loops back to process action (508) until the entire row has been sent to the client. If the row mapping index indicates that the subject row bytes are not in the read buffer, then process action (514) determines if the subject row bytes are located in persistent storage 406. If the row mapping index indicates that the subject row bytes are located in persistent storage, process action (516) uses the row mapping index offset to locate the row bytes and sends a chunk of data to update the read buffer 408. Process action (512) sends the row bytes from the updated read buffer 408 to the client 410. If the row mapping index indicates that the subject row bytes are not located in the cursor persistent storage 406, the fetch is in error and is handled by the error processing system.

Note that the movement of result set data (e.g., update of the read buffer with data from persistent storage) would cause an update to the row mapping index.

Storage compaction can be performed after fetching rows from the suspended result set, e.g., for sequential cursors. Results sets can potentially be very large and compaction can therefore minimize the resources that are used to suspend the result set.

In one embodiment, the size of the read buffer and/or write buffer can be predetermined. In an alternate embodiment, the sizes of the read and/or write buffers can be tuned dynamically, e.g., based upon system resources. In an embodiment the read buffer could be a read cache with multiple memory chunks. In another embodiment, the write buffer could be a write cache with multiple memory chunks. The memory chunks need not be contiguous memory.

As described in the earlier sections, there is a read buffer to optimize access to persistent storage, and minimize any performance degradation to the client application. In an embodiment, there need not be a read buffer or read cache. Continuing fetches from the suspended result set can be done directly from persistent storage.

Alternatively, there need not be a write buffer or write cache. The suspending of the result set can be done directly using the persistent storage.

In one embodiment, it is not necessary to re-create the server cursor before continuing from the suspended result set. In another embodiment, one may re-create the server cursor before continuing from the suspended result set.

In one embodiment, the constraint violations are checked after each row is suspended. In another embodiment the constraint violations may be checked in the middle of suspending a row, for example, after suspending each column.

The suspend and continuing processes described above can be applied to numerous specific applications. One example application is for scrollable cursors. Another example application of the suspend and continuing process is for using or migrating a result set between multiple client sessions. Another example application is when the server is busy (e.g., due to server resource constraints or otherwise), the server may choose to suspend some or all of its cursors in fetch. Once the cursors are suspended, the server can release these cursor areas and/or session to reclaim resources. Later when the system is less busy or otherwise, the server can continue fetches from the suspended result set, in perhaps another (server) session.

For example, consider a result set that is generated for a browser session which connects to a database server. The browser session accesses the results of a query across one or more web pages through a client session. Further consider if the browser session is separated or cut off from its associated client session, e.g., because of resource constraints or timeout policies. Each client session will have a corresponding session state at the database server. The present approach can be used to suspend the browser result set when the browser session is detached from the client session. When the browser session is reconnected, it may be associated with a different client session. Indeed, the original client session may itself no longer exist. Instead of re-executing the query, the browser session can directly continue fetching from the suspended result set through a different client session.

Cursor Scrolling

One example of continuing a suspended result set is for cursor scrolling. A recent advance in cursor fetching is to allow cursor accesses to a result set in an arbitrary order. In this approach the cursor can move in any direction or jump anywhere in the result set to access a row of data, even for data that has already been fetched. One way to fetch data from anywhere in the result set is to convert the cursor request into a row number.

Non-scrollable cursors are limited to fetching rows in forward sequential manner. According to an embodiment, a scrollable cursor fetch provides support for forward and backward access to a result set from a current position, using absolute or relative row number offsets into the result set. One may also use keywords such as FIRST, LAST, PRIOR (or PREVIOUS), CURRENT, NEXT to specify the scrollable fetch position.

Note that when a scrollable cursor fetch call, all the rows from the last row suspended through to all the rows in this client request may be suspended. In another embodiment, the server may suspend more rows that what the client has requested. In another example, if the scrollable cursor requests the last row in the result set, the last row is returned to the client and all the rows from last row suspended from the row source through the last row in the result set are suspended.

In one embodiment, the scrollable cursor fetch is converted into an absolute row number in the result set. For example, assume that a client scrollable cursor current position starts at row number 0. Further assume the next fetch uses relative positioning with offset +5 and the number of rows equals to 10. In this example, the fetch request is converted to absolute row number current position +5, i.e., 0+5=5. The server fetch logic is requested to fetch row numbers 5 through 14. Then, the row mapping index is used to determine the location of the rows in the suspended result set.

For sequential cursors the fetching is in sequential order. For example, using FIG. 1B, the client executes a query in process action (101). Process action (102) determines if the query result set suspension is enabled. Process 100 fetches the rows from the cursor row source in process action (104) without suspending the result set. More specifically, as process action (104) calls fetch process 300 in FIG. 3 or fetch process 500 in FIG. 5B, process action (306) and (506) both return the result set directly from the row source starting with the first row and proceeding sequentially.

For scrollable cursors the client fetch does not have to be in any order as stated in the example above. That is, the fetching processes, process 300 in FIG. 3 and process 500 in FIG. 5B, must be able to return a row from anywhere in the result in any order.

In one embodiment the implementation of scrollable cursors can be to directly suspend each row it obtains from the row source without requiring an additional scrollable cursor workspace. In another embodiment, rows are converted from the scrollable workspace into the suspended storage. The scrollable workspace format may be different from the suspended storage format.

In another embodiment, the scrollable workspace would have the rows stored in the same format as needed by the suspend/continuing logic. Now the copying of rows from scrollable workspace into suspended storage is more efficient.

In one embodiment, action 204 in FIG. 2A would first suspend the rows from the scrollable workspace and then continue suspending rows from the cursor row source.

In another embodiment, action 204 in FIG. 2A is implemented such that the cursor row source itself is scrollable so it would return the row to be suspended without requiring an additional scrollable workspace. For sequential cursors the suspending of rows may only be for those rows not yet sent to the client. For scrollable cursors, since the client can ask for any row(s), including those already seen, the entire result set may need to be suspended.

Using FIG. 1B, the client executes a scrollable cursor in process action (101). Process action (102) determines if the result set suspension is enabled. Process action (106) determines if the requested row has been suspended in the enabled result set suspension process. If the row has been suspended, process 100 initiates a fetch (extract) operation in process action (108). That is, process action (108) calls fetch process 300 in FIG. 3 (or fetch process 500 in FIG. 5B if the suspending is complete). In one embodiment, when a scrollable cursor requests a row in a result set, process action (310) in FIG. 3 or process action 510 in FIG. 5B (if suspending is complete) determines the absolute row number, uses the row mapping index to find the storage and offset in storage of the requested row, updates the read buffer if necessary, and returns the row to the client.

If the row requested has not yet been suspended (as in the case of jumping ahead with the scrollable cursor), process action (110) determines if the row should be suspended. For a scrollable cursor, process action 110 would determine that the row should be suspended. For a partial scrollable cursor, it is possible that process action 110 would determine not to suspend all rows. If process action (110) determines that the row should not be suspended, a fetch process is called to return the row from the cursor row source. If the row should be suspended, process action (112) calls process 200 in FIG. 2A to suspend the row.

Referring to FIG. 3, in one embodiment, if it is determined to suspend a row (331), then the row is sent from the row source (333) and then suspended (335). Alternatively, and with reference to FIG. 1B, the row is suspended first (112), then fetched from the suspended result set (108) and then sent to the client (114).

System Architecture Overview

Figure 6:
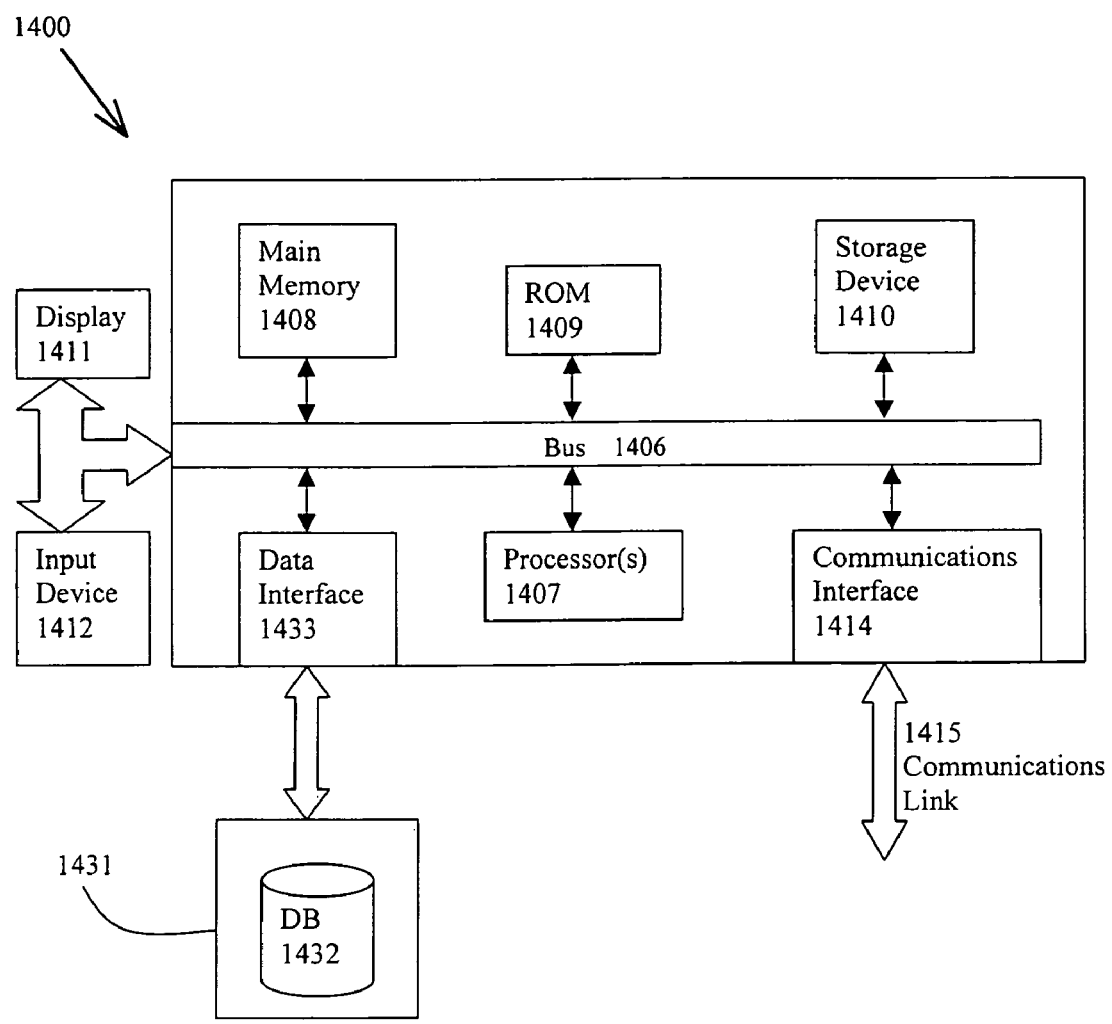
FIG. 6 is a representation of a system on which suspending a result set and continuing a suspended result set would take place.

The execution of the sequences of instructions required may be performed in some embodiments by a computer system 1400 as shown in FIG. 6. In an embodiment, execution of the sequences of instructions required is performed by a single computer system 1400. According to other embodiments, two or more computer systems 1400 coupled by a communication link 1415 may perform the sequence of instructions required in coordination with one another. In order to avoid needlessly obscuring the explanation, a description of only one computer system 1400 will be presented below; however, it should be understood that any number of computer systems 1400 may be employed.

A computer system 1400 according to an embodiment will now be described with reference to FIG. 6, which is a block diagram of the functional components of a computer system 1400 according to an embodiment. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem, or the communication link 1415 may be the Internet, in which case the communicate interface 1414 may be a wireless, cable, or dial-up modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys or a pointing device such as a mouse, is coupled to the bus 1406 for communicating information and command selections to the processor(s) 1407.

According to one embodiment, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions. Thus, embodiments are not limited to any specific combination of hardware circuitry and/or software. In one embodiment, the term "logic" shall mean any combination of software or hardware that is used to implement some or all of the embodiments.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with references to specific elements. However, it will be evident that various modifications can changes my be made thereto without departing from the broader spirit and scope. For example, the reader is to understand that the specific ordering and combination of process actions shown in the process flow diagrams herein is merely illustrative, and the embodiments can be performed using different or additional process actions, or a different combination or ordering of process actions. The specification and drawings are, accordingly, to be regarded in an illustrative rather than restrictive sense.

We claim:

1. A computer implemented method for suspending a result set for scrollable cursors, comprising:

receiving a request for data in an original result set which is generated in response to the request or to a query, wherein the original result set in a first computer readable storage medium is maintained by a first scrollable cursor state on a side of a server and a second scrollable cursor state on a side of a client;

suspending, by using a processor, the data from the original result set by copying the original result set to a second computer readable storage medium to allow the client to access, from the result set that is being suspended, the same data or same order of the data of the original result set without re-issuing or re-executing the query or a new query, wherein, the result set that is being suspended allows the data of the original result set to be accessible by the client without retaining the first scrollable cursor state on the side of the server when the original result set is no longer available to the client, and the client is allowed to access the same data or the same order of the data of the original result set from the result set that is being suspended without re-issuing or re-executing the query or the new query while ensuring correctness in accessing the data;

fetching the data from the original result set or from the data set that is being suspended; and displaying a result of the act of fetching the data on a display apparatus or storing the result of the act of fetching the data in a tangible computer usable storage medium, the first computer readable storage medium, the second computer readable medium, or a storage device.

2. The computer implemented method of claim 1, wherein the act of fetching the data comprises:

determining that the result set suspension is enabled, indicating suspending is occurring or has occurred;

determining a location of the suspended data of the result set; and returning the data from the location.

3. The method of claim 1, wherein the data comprises a row of data.

4. The computer implemented method of claim 3, wherein the act of determining a location of the row comprises:

converting a client request into a row number; and reading the location and offset from a row mapping index, the location and offset corresponding to the converted row number.

5. The method of claim 3, wherein the row is the last row.

6. The method of claim 5, wherein a subsequent call requests a row that has a lower row number than a first call.

7. The computer implemented method of claim 1, wherein the act of suspending the data from the result set further comprises:

suspending the data into the second computer readable medium;

determining whether any of a set of constraint values have been exceeded;

determining whether there are more data to be suspended if the constraint values have not been exceeded; and repeating the act of suspending the data, the act of determining whether any of the set of constraint values have been exceeded, and the act of determining whether there are more data to be suspended if there are more data to be suspended.

8. The method of claim 7 wherein the storage location is shareable across sessions or nodes.

9. The computer implemented method of claim 7, wherein the second computer readable storage medium comprises memory, persistent storage, or a combination of the persistent storage and the memory.

10. The computer implemented method of claim 7, wherein the second computer readable storage medium is a self describing storage.

11. The computer implemented method of claim 1, wherein the method is reentrant which is characterized by being capable of being stopped and later invoked to further suspend additional data of the original result set.

12. The computer implemented method of claim 1, wherein the result set that is being suspended is transmitted from a first node to a second node.

13. The method of claim 1, wherein the first scrollable cursor is a cursor for a distributed SQL query.

14. A computer implemented method for continuing a suspended result set for scrollable cursors, comprising:
receiving a call for data in an original result set which is generated in response to the call or to a query, wherein the original result set in a first computer readable medium is maintained by a first scrollable cursor state on a side of a server and a second scrollable cursor state on a side of a client;
fetching, by using a processor, the data of the original result set from a suspended result set, wherein
suspension of the original result set by copying the original result set to a second computer readable storage medium allows the client to access, from the result set that is being suspended, same data or same order of the data of the original result set without re-issuing or re-executing the query, and the result set that is being suspended allows the data of the original result set to be accessible by the client without retaining the first scrollable cursor state on the side of the server when the original result set is no longer available to the client, and
the client is allowed to access, from the result set that is being suspended, the same data or the same order of the data of the original result set without re-issuing or re-executing the query or the new query while ensuring correctness in accessing the data; and
displaying a result of the act of fetching the data on a display apparatus or storing the result of the act of fetching the data in a tangible computer usable medium, the first computer readable storage medium, the second computer readable storage medium, or a storage device.

15. The method of claim 14, wherein the data comprises a row of data.

16. The method of claim 15, wherein the row is the last row.

17. The method of claim 15, wherein a subsequent call requests a row that has a lower row number than a first call.

18. The computer implemented method of claim 14, wherein the act of fetching the data comprises:
determining that the result set suspension is enabled, indicating suspending is occurring or has occurred;
determining a location of the data of the result set; and
returning the data from the location.

19. The computer implemented method of claim 18 wherein the data comprises a row, and the act of determining the location of the subject row comprises:
converting a client request into a row number; and
reading the location and offset from a row mapping index, the location and offset corresponding to the converted row number.

20. The computer implemented method of claim 14, wherein the result set that is being suspended is available after a server session of the cursor is closed.

21. The computer implemented method of claim 14 wherein the result set that is being suspended is shareable across sessions or nodes.

22. The computer implemented method of claim 14, wherein the result set that is being suspended comprises memory, persistent storage, or a combination of the persistent storage and the memory.

23. The computer implemented method of claim 1, wherein the result set that is being suspended is available for the life of the first scrollable cursor.

24. The computer implemented method of claim 23, wherein the life of the first scrollable cursor is the life of a client cursor.

25. The computer implemented method of claim 14, wherein the result set that is being suspended includes an entire cursor row source.

26. The computer implemented method of claim 14, wherein the result set that is being suspended includes a subset of a cursor row source.

27. The computer implemented method of claim 14, wherein the first scrollable cursor is a cursor for a distributed SQL query.

28. A system for continuing a suspended result set for scrollable cursors, comprising:
means for receiving a call for data in an original result set which is generated in response to a query, wherein
the original result set in a first computer readable medium is maintained by a first scrollable cursor state on a side of a server and a second scrollable cursor state on a side of a client; and
a processor for fetching the data of the original result set from a suspended result set, wherein
suspension of the original result set by copying the original result set to a second computer readable storage medium allows the client to access, from the result set that being suspended, same data or same order of the data of the original result set without re-issuing or re-executing the query or a new query, and the result set that is being suspended allows the data of the original result set to be accessible by the client without retaining the first scrollable cursor state on the side of the server when the original result set is no longer available to the client, and
the client is allowed to access, from the result set that is being suspended, the same data or the same order of the data of the original result set from the result set that is being suspended without re-issuing or re-executing the query or the new query while ensuring correctness in accessing the data; and
a display apparatus configured for displaying a result of the act of fetching the data or a tangible computer usable medium, the first computer readable storage medium, the second computer readable storage medium, or a storage device configured for storing the result.

29. A computer program product comprising a volatile or non-volatile computer usable medium having executable code which, when executed by a processor, causes the processor to execute a process for continuing a suspended result set for scrollable cursors, the process comprising:
receiving a call for data in an original result set which is generated in response to the call or to a query, wherein
the original result set in a first computer readable medium is maintained by a first scrollable cursor state on a side of a server and a second scrollable cursor state on a side of a client; and
fetching, by using the processor, the data of the original result set from the suspended result set, wherein
suspension of the original result set by copying the original result set to a second computer readable storage medium allows the client to access, from the result set that is being suspended, same data or same order of the data of the original result set without re-issuing or re-executing the query or a new query, and the result set that is being suspended allows the data of the original result set to be accessible by the client without retaining the first scrollable cursor state on the side of the server when the original result set is no longer available to the client, and the client is allowed to access, from the result set that is being suspended, the same data or the same order of the data of the original result set from the result set that is being suspended without re-issuing or re-executing the query or the new query while ensuring correctness in accessing the data; and displaying a result of the act of fetching the data on a display apparatus or storing the result of the act of fetching the data in a tangible computer usable medium, the first computer readable storage medium, the second computer readable storage medium, or a storage device.

30. A system for suspending a result set for scrollable cursors, comprising:

means for receiving a request for data in an original result set which is generated in response to the request or to a query, wherein the original result set in a first computer readable storage medium is maintained by a first scrollable cursor state on a side of a server and a second scrollable cursor state on a side of a client;

a processor for suspending the data from the original result set by copying the original result set to a second computer readable storage medium to allow the client to access, from the result set that is being suspended, the same data or same order of the data of the original result set without re-issuing or re-executing the query or a new query, wherein the result set that is being suspended allows the data of the original result set to be accessible by the client without retaining the first scrollable cursor state on the side of the server when the original result set is no longer available to the client, and the client is allowed to access same data or same order of the data of the original result set from the result set that is being suspended without re-issuing or re-executing the query or a new query while ensuring correctness in accessing the data; and means for fetching the data from the original result set or from the data set that is being suspended; and a display apparatus displaying a result of the act of fetching the data or a tangible computer usable medium, the first computer readable storage medium, the second computer readable storage medium, or a storage device storing the result of the act of fetching the data.

31. The system of claim 28, wherein the result set that is being suspended is available after a server session of the first scrollable cursor is closed.

32. The system of claim 28, wherein the result set that is being suspended is shareable across sessions or nodes.

33. The computer program product of claim 29, wherein the result set that is being suspended is available after a server session of the first scrollable cursor is closed.

34. The computer program product of claim 29, wherein the result set that is being suspended is shareable across sessions or nodes.

35. The system of claim 30, wherein the result set that is being suspended is available after a server session of the first scrollable cursor is closed.

36. The system of claim 30, wherein the result set that is being suspended is shareable across sessions or nodes.

* * * * *

UNITED STATES PATENT AND TRADEMARK OFFICE
CERTIFICATE OF CORRECTION

| | | |
|---|---|---|
| PATENT NO. | : 7,743,333 B2 | Page 1 of 1 |
| APPLICATION NO. | : 11/097065 | |
| DATED | : June 22, 2010 | |
| INVENTOR(S) | : Mehul D. Bastawala et al. | |

It is certified that error appears in the above-identified patent and that said Letters Patent is hereby corrected as shown below:

In column 17, line 43, delete "my" and insert -- may --, therefor.

In column 20, line 26, in claim 28, after "that" insert -- is --.

Signed and Sealed this
Twelfth Day of July, 2011

David J. Kappos
*Director of the United States Patent and Trademark Office*